United States Patent
Gam

[19]

[11] Patent Number: 6,015,537
[45] Date of Patent: Jan. 18, 2000

[54] PROCESS AND REACTOR FOR THE PREPARATION OF AMMONIA

[75] Inventor: Erik Andreas Gam, Hørsholm, Denmark

[73] Assignee: Haldor Topsoe A/S, Lyngby, Denmark

[21] Appl. No.: 09/060,541

[22] Filed: Apr. 14, 1998

[30] Foreign Application Priority Data

Apr. 21, 1997 [DK] Denmark ................................. 0444/97

[51] Int. Cl.$^7$ ................................. C01C 1/04; C01C 1/00
[52] U.S. Cl. ........................... 423/360; 422/148; 423/361
[58] Field of Search ..................... 423/360, 361; 422/148

[56] References Cited

U.S. PATENT DOCUMENTS

| | | | |
|---|---|---|---|
| 3,395,982 | 8/1968 | Didycz | 423/360 |
| 3,549,335 | 12/1970 | Grotz, Jr. | 423/360 |
| 4,181,701 | 1/1980 | Topsoe et al. | 422/158 |
| 4,230,680 | 10/1980 | Becker et al. | 423/360 |
| 4,423,022 | 12/1983 | Albano et al. | 423/360 |
| 4,510,123 | 4/1985 | Grotz | 423/360 |
| 4,518,574 | 5/1985 | Osman | 423/360 |
| 4,624,842 | 11/1986 | Grotz, Jr. | 423/360 |
| 4,696,799 | 9/1987 | Noe | 423/360 |
| 4,744,966 | 5/1988 | Grotz | 423/360 |
| 4,867,959 | 9/1989 | Grotz | 423/360 |
| 4,963,338 | 10/1990 | Zardi et al. | 423/360 |
| 5,427,760 | 6/1995 | Grotz | 423/360 |
| 5,585,074 | 12/1996 | Zardi et al. | 423/360 |

FOREIGN PATENT DOCUMENTS

| | | |
|---|---|---|
| 0 007 743 | 2/1980 | European Pat. Off. . |
| 0 121 355 | 10/1984 | European Pat. Off. . |
| 0 222 069 | 5/1987 | European Pat. Off. . |
| 0297474 | 1/1989 | European Pat. Off. . |
| 0 332 757 | 9/1989 | European Pat. Off. . |
| 0 374 564 | 6/1990 | European Pat. Off. . |
| 0483919 | 5/1992 | European Pat. Off. . |
| 1258410 | 12/1971 | United Kingdom . |
| 9205112 | 4/1992 | WIPO . |

*Primary Examiner*—Wayne Langel
*Attorney, Agent, or Firm*—Ostrolenk, Faber, Gerb & Soffen, LLP

[57] ABSTRACT

Process for the preparation of ammonia at elevated pressure and temperature in an ammonia reactor, comprising passing a process stream of ammonia synthesis gas successively through at least three catalyst beds and reacting the synthesis gas in the beds;

intermediately cooling of partially reacted synthesis gas leaving the catalyst beds by heat exchange in heat exchangers arranged between each catalyst bed and withdrawing a product effluent being rich in ammonia, wherein the process stream is obtained by combining prior to introduction into a first catalyst bed, a first feed stream of synthesis gas having been preheated through indirect heat exchange during the intermediate cooling of the partially converted synthesis gas, a second feed stream of synthesis gas having been preheated by indirect heat exchange with the product effluent, and a third feed stream of synthesis gas for adjustment of temperature of the process stream and wherein the first feed stream is passed successively through the interbed heat exchangers for cooling the partially converted synthesis gas.

2 Claims, 1 Drawing Sheet

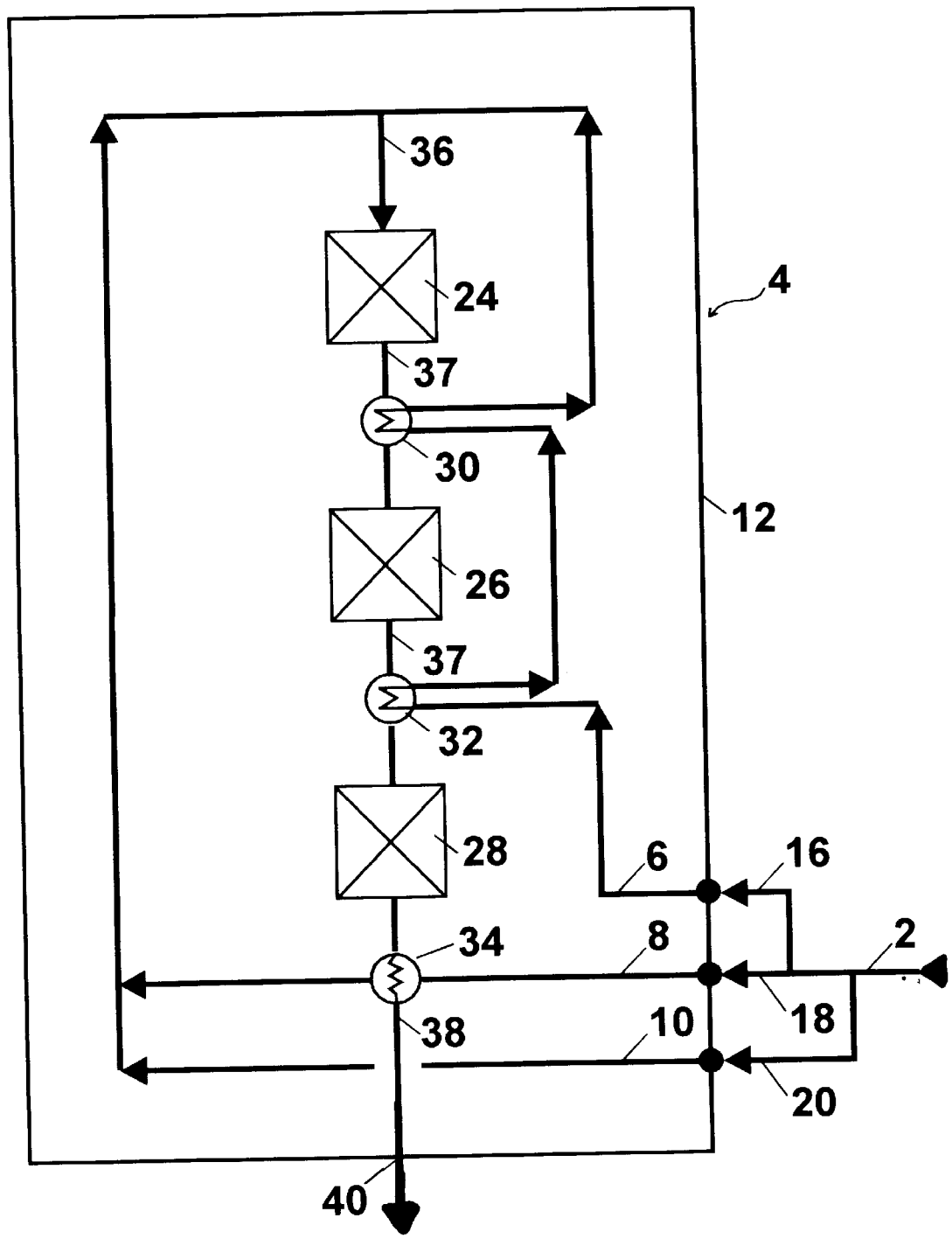

PROCESS AND REACTOR FOR THE PREPARATION OF AMMONIA

The present invention relates to a process and reactor for the preparation of ammonia from a synthesis gas comprising nitrogen and hydrogen by passage of the synthesis gas through a number of catalyst beds with intermediate cooling of partially converted synthesis gas between the catalyst beds. In particular, the invention concerns an improved process of the above type and an ammonia reactor for use in the process, wherein cooling of the partially converted synthesis gas is performed by indirect heat exchange with a single stream of fresh synthesis gas.

U.S. Pat. No. 4,181,701 discloses an ammonia reactor with a top and a bottom catalyst bed with a central heat exchanger mounted on one of the beds. A process stream of synthesis gas is obtained by combining inside the reactor separate feed streams;
a shell stream serving to cool the reactor shell, an exchange stream serving to cool the central heat exchanger, and a by-pass stream for final adjustment of the temperature of the process stream.

Indirect cooling of partially converted ammonia synthesis gas in a reactor with more than two catalyst beds is, furthermore, known in the art and conventionally applied for in the industry.

Thereby, the synthesis gas is indirectly cooled with fresh synthesis gas being passed in a number of separate streams to heat exchangers between the catalyst beds. The streams are introduced through separate pipe connections mounted in the reactor shell.

The major drawback of the known ammonia preparation processes with intermediate cooling of partially converted synthesis gas in a number of interbed heat exchangers with separate gas streams is the need for numerous inlet means and complicated piping in the ammonia reactor.

It is thus an object of this invention to provide a process for the preparation of ammonia in more than two catalyst beds with intermediate cooling of partially converted synthesis gas, wherein the gas is cooled between the catalyst beds by indirect heat exchange without the above drawbacks of the known processes.

In accordance with the above object, this invention provides a process for the preparation of ammonia at elevated pressure and temperature in an ammonia reactor, comprising passing a process stream of ammonia synthesis gas successively through at least three catalyst beds and reacting the synthesis gas in the beds;
intermediately cooling of partially reacted synthesis gas leaving the catalyst beds by heat exchange in heat exchangers arranged between each catalyst bed and withdrawing a product effluent being rich in ammonia, wherein the process stream is obtained by combining prior to introduction into a first catalyst bed, a first feed stream of synthesis gas having been preheated through indirect heat exchange during the intermediate cooling of the partially converted synthesis gas, a second feed stream of synthesis gas having been preheated by indirect heat exchange with the product effluent, and a third feed stream of synthesis gas for adjustment of temperature of the process stream and wherein the first feed stream is passed successively through the interbed heat exchangers for cooling the partially converted synthesis gas.

A further object of the invention is to provide an ammonia reactor for use in the inventive process with simplified inlet and piping means for distribution of fresh synthesis gas serving as cooling medium in indirect heat exchange with partially reacted synthesis gas between each catalyst bed.

Thus, an ammonia reactor according to the invention, comprises within a cylindrical pressure shell at least a first, a second and a last catalyst bed vertically arranged around a common axis and connected in series;
intermediate heat exchanging means arranged between each catalyst bed for intermediate cooling of a partially converted ammonia synthesis gas from the catalyst bed by indirect heat exchange with a first feed stream of fresh ammonia synthesis gas;
feed-effluent heat exchanging means arranged at outlet of the last catalyst bed for cooling of an ammonia product effluent stream by indirect heat exchange with a second feed stream of ammonia synthesis gas;
inlet means for introducing the first feed stream and inlet means for introducing the second feed stream into the reactor;
inlet means for introducing a third feed stream of fresh ammonia synthesis gas into the reactor;
means for passing the first, the second and the third feed stream to the top catalyst bed; and
means for combining the feed streams to a process stream prior to introduction of the process stream into the top catalyst bed,
wherein the means for passing the first feed stream consists of a passage-way for connecting in series the intermediate heat exchangers and for passing the first stream from the inlet means consecutively through the intermediate heat exchanging means to the means for combining the feed streams.

The invention will be explained in more detail in the following description by reference to the drawings, in which the sole FIGURE shows in pure schematic form a sectional view of an ammonia reactor according to a specific embodiment of the invention.

When operating the invention, fresh ammonia synthesis gas 2 is introduced into an ammonia reactor 4 being constructed according to a specific embodiment of the invention. The synthesis gas is introduced in three separate feed streams 6, 8, 10 through inlets 16, 18 and 20 arranged in shell 12 of the reactor. Reactor 4 comprises within the shell a top catalyst bed 24, a central catalyst bed 26 and a bottom catalyst bed 28. Between beds 24 and 26 and between beds 26 and 28 heat exchangers 30 and 32 are arranged for cooling a partly converted process stream 37 leaving beds 24 and 26. A bottom heat exchanger 34 arranged downstream bottom catalyst bed 28 serves for cooling of a product effluent 38 from bed 28. Fresh synthesis gas is passed in process stream 36 to bed 24 and partly converted in bed 24. The partly converted synthesis gas is then passed in process stream 37 successively through beds 26 and 28. By passage through the beds nitrogen and hydrogen in the stream react exothermically to ammonia and product effluent 38 being rich in ammonia. Product effluent 38 is cooled in heat exchanger 34 by indirect cooling with feed stream 8 before being withdrawn from the reactor through outlet 40.

As mentioned hereinbefore, the reaction between hydrogen and nitrogen proceeds exothermically in the catalyst beds and the temperature of the process stream rises. Because of thermodynamical reasons the temperature of process stream 37 has to be lowered, prior to being introduced into beds 26 and 28. The stream is thereby cooled in heat exchangers 30 and 32 by indirect heat exchange with feed stream 6, being passed in series through heat exchangers 32 and 30.

By passage through the heat exchangers feed streams 6 and 8 are preheated by indirect heat exchange as described above. The preheated feedstreams are then combined to process stream 36 upstream top catalyst bed 24. Before being introduced in bed 24, the temperature of process stream 36 is adjusted by addition of a cold feed stream 10.

I claim:

1. Process for the preparation of ammonia at elevated pressure and temperature in an ammonia reactor, comprising passing a process stream of ammonia synthesis gas successively through at least three catalyst beds and reacting the synthesis gas in the beds;

intermediately cooling of partially reacted synthesis gas leaving the catalyst beds by heat exchange in heat exchangers arranged between each catalyst bed and withdrawing a product effluent being rich in ammonia, wherein the process stream is obtained by combining prior to introduction into a first catalyst bed, a first feed stream of synthesis gas having been preheated through indirect heat exchange during the intermediate cooling of the partially converted synthesis gas, a second feed stream of synthesis gas having been preheated by indirect heat exchange with the product effluent, and a third feed stream of synthesis gas for adjustment of temperature of the process stream and wherein the first feed stream is passed successively through the interbed heat exchangers for cooling the partially converted synthesis gas.

2. Ammonia reactor comprising within a cylindrical pressure shell at least a first, a second and a last catalyst bed vertically arranged around a common axis and connected in series;

intermediate heat exchanging means arranged between each catalyst bed for intermediate cooling of a partially converted ammonia synthesis gas from the catalyst bed by indirect heat exchange with a first feed stream of fresh ammonia synthesis gas;

feed-effluent heat exchanging means arranged at outlet of the last catalyst bed for cooling of an ammonia product effluent stream by indirect heat exchange with a second feed stream of ammonia synthesis gas;

inlet means for introducing the first feed stream and inlet means for introducing the second feed stream into the reactor;

inlet means for introducing a third feed stream of fresh ammonia synthesis gas into the reactor;

means for passing the first, the second and the third feed stream to the top catalyst bed; and means for combining the feed streams to a process stream prior to introduction of the process stream into the top catalyst bed, wherein the means for passing the first feed stream consists of a passage-way for connecting in series the intermediate heat exchangers and for passing the first stream from the inlet means consecutively through the intermediate heat exchanging means to the means for combining the feed streams.

* * * * *